United States Patent
Schreiner

(10) Patent No.: US 8,572,941 B1
(45) Date of Patent: Nov. 5, 2013

(54) DOFFER ADJUSTMENT DEVICE FOR A COTTON HARVESTER UNIT

(75) Inventor: Joel M. Schreiner, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/467,581

(22) Filed: May 9, 2012

(51) Int. Cl.
*A01D 46/16* (2006.01)

(52) U.S. Cl.
USPC .............................................................. 56/44

(58) Field of Classification Search
USPC ........................................... 56/44, 41, 50, 28
See application file for complete search history.

(56) References Cited

U.S. PATENT DOCUMENTS

| | | | | |
|---|---|---|---|---|
| 1,828,534 A | * | 10/1931 | Johnston et al. | 56/44 |
| 2,654,202 A | * | 10/1953 | Millard | 56/41 |
| 2,664,688 A | * | 1/1954 | Nickla | 56/41 |
| 2,664,689 A | * | 1/1954 | Walker et al. | 56/41 |
| 3,014,332 A | * | 12/1961 | Hubbard | 56/41 |
| 3,214,868 A | * | 11/1965 | Riley | 451/347 |
| 3,224,178 A | * | 12/1965 | Kennedy | 56/41 |
| 3,245,210 A | * | 4/1966 | Hubbard | 56/44 |
| 3,292,352 A | * | 12/1966 | Shaw | 56/41 |
| 3,427,791 A | * | 2/1969 | Hubbard | 56/41 |
| 4,742,672 A | * | 5/1988 | Orsborn | 56/41 |
| 4,819,415 A | * | 4/1989 | Engelstad et al. | 56/41 |
| 5,014,502 A | | 5/1991 | Richman et al. | |
| 5,325,656 A | * | 7/1994 | Schreiner et al. | 56/10.2 H |
| 5,490,373 A | * | 2/1996 | Davenport et al. | 56/41 |
| 5,557,911 A | | 9/1996 | Sanderson et al. | |
| 6,415,589 B1 | * | 7/2002 | Yribarren et al. | 56/41 |

* cited by examiner

*Primary Examiner* — Árpád Fábián-Kovács

(57) ABSTRACT

A doffer adjustment device for a unit of a cotton harvester. The unit includes a frame. A drum is rotatably coupled to the frame. A plurality of rows of spindles is rotatably coupled to the drum. A doffer column is rotatably coupled to the frame and configured to remove cotton from the spindles. The doffer adjustment device includes an adjusting member having a shaft portion and a wrench receiving portion. A locking device is coupled to the shaft portion. Wherein, the locking device is yieldable to an input causing rotation of the wrench receiving portion.

15 Claims, 4 Drawing Sheets

DOFFER ADJUSTMENT DEVICE FOR A COTTON HARVESTER UNIT

FIELD OF THE DISCLOSURE

The present disclosure generally relates to cotton harvesters and more particularly to a doffer adjustment device for a unit of a cotton harvester.

BACKGROUND OF THE DISCLOSURE

In order to remove picked cotton from a spindle, cotton harvester units commonly include adjustable doffer columns having a plurality of doffers. The doffer is a disc that is typically coated in rubber or urethane and rotated to a tangential velocity that is significantly greater than that of the spindle. As the spindle is moved under the face of the doffer, cotton is unwrapped and stripped off of the spindle. Due to the abrasiveness of cotton fibers, the doffer coating erodes. Since the effectiveness of the doffer is a function of doffer to spindle clearance, the doffer must be regularly adjusted to compensate for doffer pad wear.

The adjustment is accomplished by two actions. A first action involves rotating a movable threaded bearing housing inside of a fixed threaded mounting component using a wrench. A second action is performed to lock the movable housing in place. For example, Case IH cotton harvesting units currently use a locking strap (U.S. Pat. No. 5,014,502) that is held in place with additional hardware. Whereas, John Deere cotton harvesting units currently use a jam nut, which requires an additional wrench.

SUMMARY OF THE DISCLOSURE

In one embodiment, a doffer adjustment device for a unit of a cotton harvester is disclosed. The unit includes a frame. A drum is rotatably coupled to the frame. A plurality of rows of spindles is rotatably coupled to the drum. A doffer column is rotatably coupled to the frame and configured to remove cotton from the spindles.

The doffer adjustment device includes an adjusting member having a shaft portion and a wrench receiving portion. A locking device is coupled to the shaft portion. Wherein, the locking device is yieldable to an input causing rotation of the wrench receiving portion.

In another embodiment, a doffer adjustment device for a unit of a cotton harvester is disclosed. The unit includes a frame. A drum is rotatably coupled to the frame. A plurality of rows of spindles is rotatably coupled to the drum. A doffer column is positioned adjacent the spindles and configured to remove cotton from the spindles. A fixed housing is coupled to the frame. A bearing housing is positioned to rotatably support the doffer column. The bearing housing is threadably engaged with the fixed housing for doffer column adjustment relative to the fixed housing.

The doffer adjustment device includes an adjusting member having a shaft portion and a wrench receiving portion. The adjusting member is configured for rotating the bearing housing to adjust the doffer column relative to the spindles. A locking device is coupled to the shaft portion. Wherein, the locking device is yieldable to an input causing rotation of the wrench receiving portion.

In yet another embodiment, a doffer adjustment device for a unit of a cotton harvester is disclosed. The unit includes a frame. A drum is rotatably coupled to the frame. A plurality of rows of spindles is rotatably coupled to the drum. A doffer column is positioned adjacent the spindles and configured to remove cotton from the spindles. A fixed housing is coupled to the frame. A bearing housing is positioned to rotatably support the doffer column. The bearing housing is threadably engaged with the fixed housing for doffer column adjustment relative to the fixed housing.

The doffer adjustment device includes an adjusting member having a shaft portion and a wrench receiving portion. The adjusting member is configured for rotating the bearing housing to adjust the doffer column relative to the spindles. A slip clutch is coupled to the shaft portion. Wherein, the slip clutch is yieldable to an input causing rotation of the wrench receiving portion.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
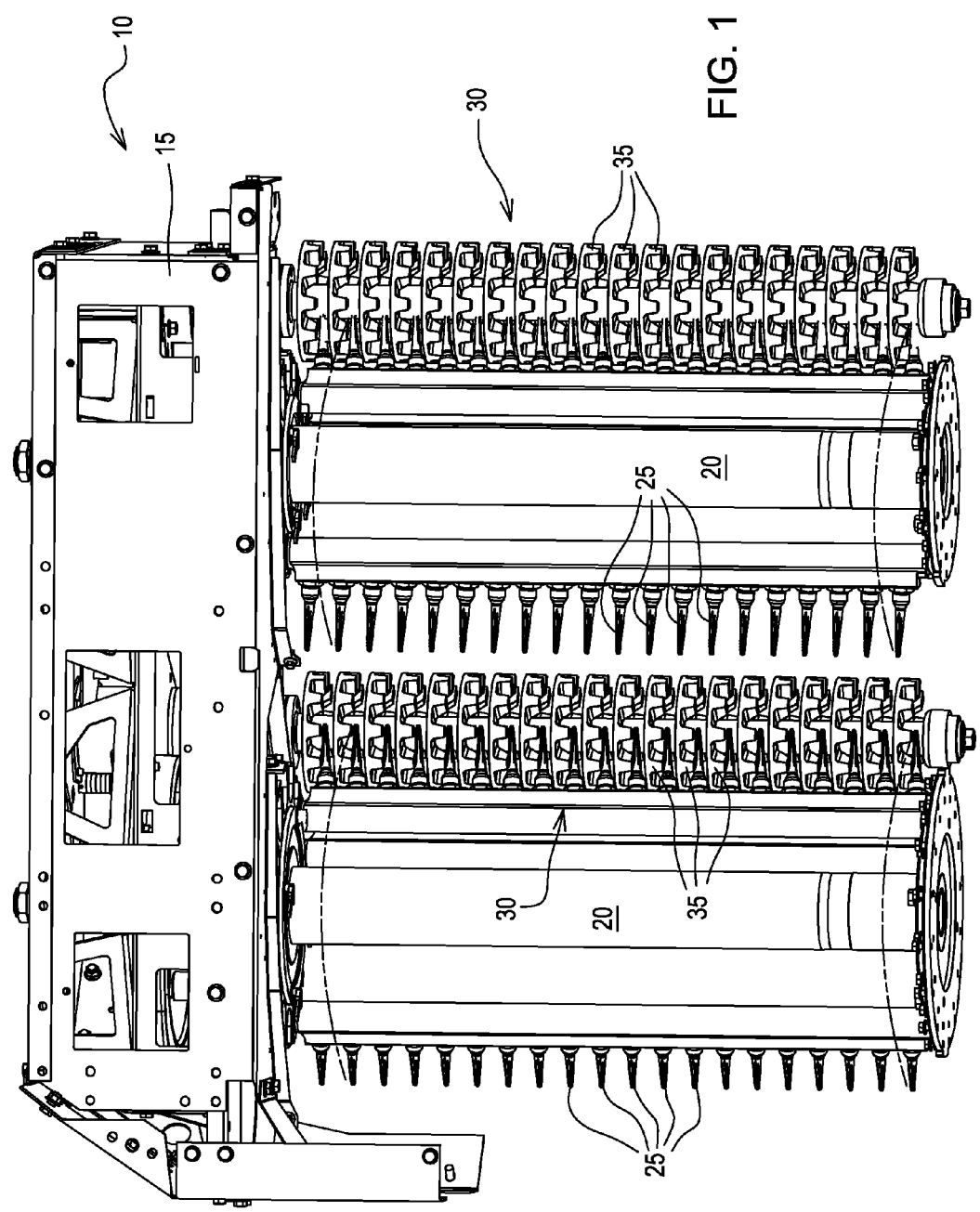
FIG. 1 is a perspective view of a portion of a cotton harvester unit according to one embodiment.
Figure 2:
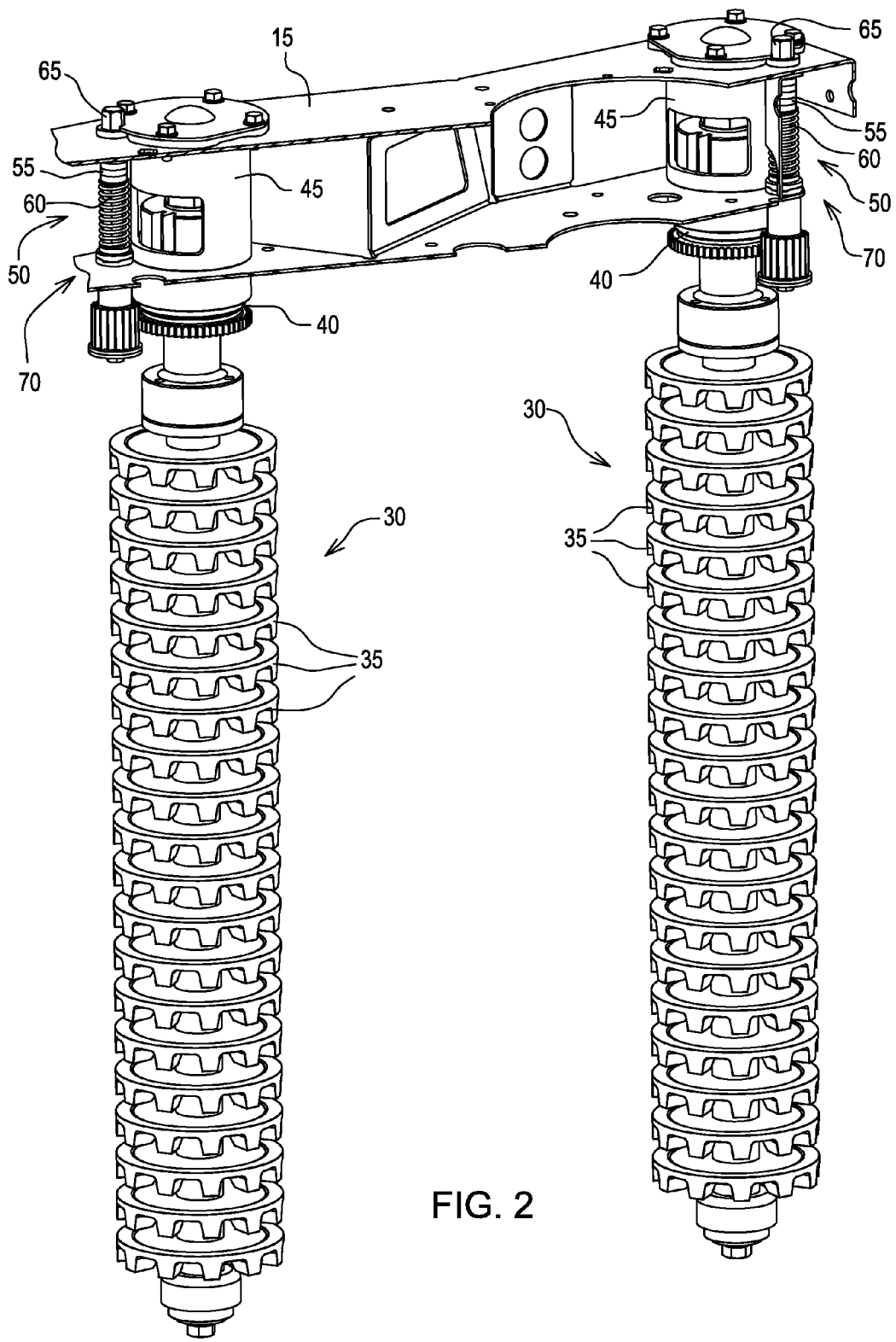
FIG. 2 is an enlarged perspective view of a portion of the cotton harvester unit of FIG. 1 showing a doffer adjustment device.
Figure 3:
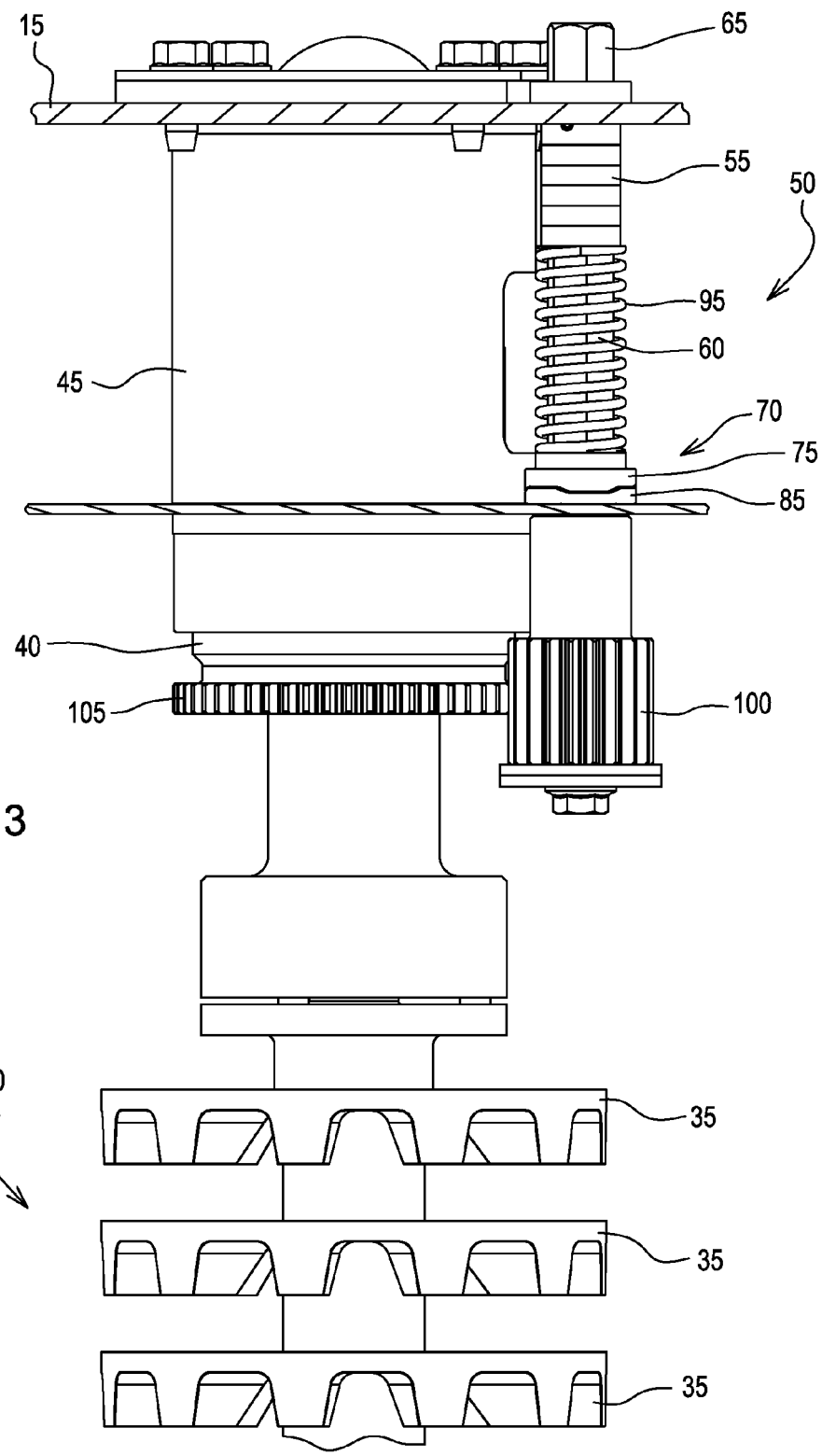
FIG. 3 is an enlarged front view of the doffer adjustment device of the cotton harvester unit of FIG. 1.
Figure 4:
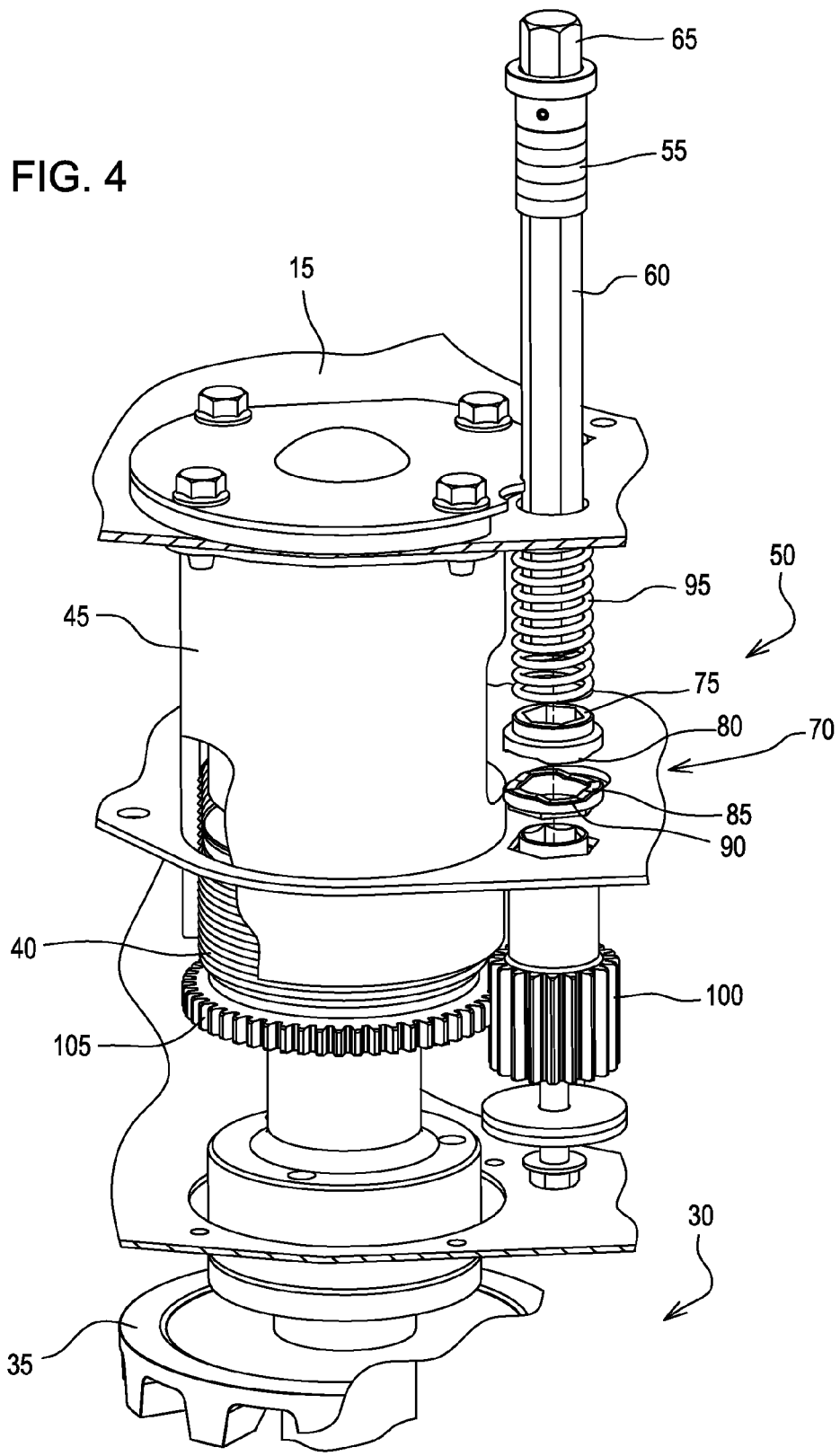
FIG. 4 is a partially exploded view of the doffer adjustment device of FIG. 3.

FIG. 1 illustrates a cotton harvester unit 10 according to one embodiment. The illustrated cotton harvester unit 10 includes a frame 15. A drum 20 is rotatably coupled to the frame 15. A plurality of rows of spindles 25 is rotatably coupled to the drum 20. With reference to FIGS. 2 and 3, a doffer column 30 having a plurality of doffers 35 is rotatably supported by a bearing housing 40. The doffers 35 are positioned adjacent the spindles 25 and configured to remove cotton from the spindles 25. The bearing housing 40 is threadably engaged with a fixed housing 45 (FIG. 4). The fixed housing 45 is coupled to the frame 15.

With continued reference to FIGS. 2 and 3, a doffer adjustment device 50 includes an adjusting member 55 having a shaft portion 60 and a wrench receiving portion 65. A locking device 70 is coupled to the shaft portion 60. The locking device 70 may be a slip clutch.

Referring to FIG. 4, the locking device 70 includes a first member 75 having at least one protrusion 80. The first member 75 is coupled to the shaft portion 60 for rotation therewith. A second member 85 has at least one receiving portion 90 that receives the protrusion 80. The second member 85 is coupled to the frame 15. A biasing member 95 biases the first member 75 into a facing relationship with the second member 85. Alternatively, the first member 75 may include at least one receiving portion 90 and the second member 85 may include at least one protrusion 80.

An adjusting member gear 100 is coupled to the shaft portion 60 for rotating a doffer column gear 105 coupled to the bearing housing 40. Alternatively, the doffer column gear 105 may be coupled to the doffer column 30.

In operation, the doffer adjustment device 50 functions to adjust the position of the doffers 35 relative to the spindles 25. A tool, such as a wrench (not shown), is used to turn the wrench receiving portion 65, which turns the first member 75 and the adjusting member gear 100. The wrench must be turned with enough force to cause the protrusion 80 of the first member 75 to rotate out of the receiving portion 90 of the second member 85. As the protrusion 80 rotates out of the receiving portion 90, positive feedback (i.e., audible, tactile) is provided that offers an indication of the change in position of the doffer column 30.

The adjusting member gear 100 turns the doffer column gear 105, which threads or unthreads the bearing housing 40 into or out of the fixed housing 45, depending on the direction of turn. This adjusts the position of the doffer column 30 and the doffers 35 relative to the spindles 25. After doffer column 30 adjustment is complete, the biasing member 95 causes the protrusion 80 to once again be received by the receiving portion 90, which holds the doffer column 30 in position without the need for a separate locking device.

Various features are set forth in the following claims.

What is claimed is:

1. A doffer adjustment device for a cotton harvester unit, the cotton harvester unit comprising a frame, a drum rotatably coupled to the frame, a plurality of rows of spindles rotatably coupled to the drum, and a doffer column rotatably coupled to the frame and configured to remove cotton from the spindles, the doffer adjustment device comprising:
   an adjusting member comprising a shaft portion and a wrench receiving portion;
   a locking device coupled to the shaft portion; and
   an adjusting member gear coupled to the shaft portion for rotating a doffer column gear coupled to the doffer column;
   wherein the locking device is yieldable to an input causing rotation of the wrench receiving portion.

2. The doffer adjustment device of claim 1, wherein the locking device is a slip clutch.

3. The doffer adjustment device of claim 1, wherein the locking device comprises a first member comprising at least one protrusion, the first member is coupled to the shaft portion for rotation therewith, a second member comprising at least one receiving portion that receives the protrusion, the second member is coupled to the frame, and a biasing member that biases the first member into a facing relationship with the second member.

4. The doffer adjustment device of claim 3, wherein at least one of the first member and the second member provides positive feedback that offers an indication of the change in position of the doffer column as the first member rotates relative to the second member.

5. The doffer adjustment device of claim 1, wherein the locking device comprises a first member comprising at least one receiving portion, the first member is coupled to the shaft portion for rotation therewith, a second member comprising at least one protrusion that is received by the receiving portion, the second member is coupled to the frame, and a biasing member that biases the first member into a facing relationship with the second member.

6. The doffer adjustment device of claim 5, wherein at least one of the first member and the second member provides positive feedback that offers an indication of the change in position of the doffer column as the first member rotates relative to the second member.

7. A doffer adjustment device for a cotton harvester unit, the cotton harvester unit comprising a frame, a drum rotatably coupled to the frame, a plurality of rows of spindles rotatably coupled to the drum, a doffer column positioned adjacent the spindles and configured to remove cotton from the spindles, a fixed housing coupled to the frame, and a bearing housing rotatably supporting the doffer column and threadably engaged with the fixed housing for doffer column adjustment relative thereto, the doffer adjustment device comprising:
   an adjusting member comprising a shaft portion and a wrench receiving portion, the adjusting member configured for rotating the bearing housing to adjust the doffer column relative to the spindles;
   a locking device coupled to the shaft portion; and
   an adjusting member gear coupled to the shaft portion for rotating a doffer column gear coupled to the bearing housing;
   wherein the locking device is yieldable to an input causing rotation of the wrench receiving portion.

8. A doffer adjustment device for a cotton harvester unit, the cotton harvester unit comprising a frame, a drum rotatably coupled to the frame, a plurality of rows of spindles rotatably coupled to the drum, a doffer column positioned adjacent the spindles and configured to remove cotton from the spindles, a fixed housing coupled to the frame, and a bearing housing rotatably supporting the doffer column and threadably engaged with the fixed housing for doffer column adjustment relative thereto, the doffer adjustment device comprising:
   an adjusting member comprising a shaft portion and a wrench receiving portion, the adjusting member configured for rotating the bearing housing to adjust the doffer column relative to the spindles;
   a locking device coupled to the shaft portion; and
   an adjusting member gear coupled to the shaft portion for rotating a doffer column gear coupled to the doffer column;
   wherein the locking device is yieldable to an input causing rotation of the wrench receiving portion.

9. The doffer adjustment device of claim 8, wherein the locking device is a slip clutch.

10. The doffer adjustment device of claim 8, wherein the locking device comprises a first member comprising at least one protrusion, the first member is coupled to the shaft portion for rotation therewith, a second member comprising at least one receiving portion that receives the protrusion, the second member is coupled to the frame, and a biasing member that biases the first member into a facing relationship with the second member.

11. The doffer adjustment device of claim 10, wherein the first member provides positive feedback that offers an indication of the change in position of the doffer column as the first member rotates relative to the second member.

12. A doffer adjustment device for a cotton harvester unit, the cotton harvester unit comprising a frame, a drum rotatably coupled to the frame, a plurality of rows of spindles rotatably coupled to the drum, a doffer column positioned adjacent the spindles and configured to remove cotton from the spindles, a fixed housing coupled to the frame, and a bearing housing rotatably supporting the doffer column and threadably engaged with the fixed housing for doffer column adjustment relative thereto, the doffer adjustment device comprising:
   an adjusting member comprising a shaft portion and a wrench receiving portion, the adjusting member configured for rotating the bearing housing to adjust the doffer column relative to the spindles;
   a slip clutch coupled to the shaft portion; and
   an adjusting member gear coupled to the shaft portion for rotating a doffer column gear coupled to the bearing housing;

wherein the slip clutch is yieldable to an input causing rotation of the wrench receiving portion.

13. The doffer adjustment device of claim 12, wherein the slip clutch provides positive feedback that offers an indication of the change in position of the doffer column.

14. The doffer adjustment device of claim 12, wherein the slip clutch comprises a first member comprising at least one protrusion, the first member is coupled to the shaft portion for rotation therewith, a second member comprising at least one receiving portion that receives the protrusion, the second member is coupled to the frame, and a biasing member that biases the first member into a facing relationship with the second member.

15. A doffer adjustment device for a cotton harvester unit, the cotton harvester unit comprising a frame, a drum rotatably coupled to the frame, a plurality of rows of spindles rotatably coupled to the drum, a doffer column positioned adjacent the spindles and configured to remove cotton from the spindles, a fixed housing coupled to the frame, and a bearing housing rotatably supporting the doffer column and threadably engaged with the fixed housing for doffer column adjustment relative thereto, the doffer adjustment device comprising:

an adjusting member comprising a shaft portion and a wrench receiving portion, the adjusting member configured for rotating the bearing housing to adjust the doffer column relative to the spindles;

a slip clutch coupled to the shaft portion; and an adjusting member gear coupled to the shaft portion for rotating a doffer column gear coupled to the doffer column;

wherein the slip clutch is yieldable to an input causing rotation of the wrench receiving portion.

\* \* \* \* \*